United States Patent [19]

Inoue et al.

[11] Patent Number: 4,998,521

[45] Date of Patent: Mar. 12, 1991

[54] IGNITION TIMING CONTROL FOR OUTBOARD MOTOR

[75] Inventors: Seiji Inoue; Seiichi Tanaka, both of Hamamatsu, Japan

[73] Assignee: Sanshin Kogyo Kabushika Kaisha, Hamamatsu, Japan

[21] Appl. No.: 493,893

[22] Filed: Mar. 15, 1990

Related U.S. Application Data

[63] Continuation of Ser. No. 325,294, Mar. 17, 1989.

[30] Foreign Application Priority Data

Mar. 16, 1989 [JP] Japan .................................. 1-64441

[51] Int. Cl.[5] .............................................. F02P 5/14
[52] U.S. Cl. ...................................... 123/424; 440/113
[58] Field of Search ............... 123/424, 406, 426, 422, 123/417, 425, 419; 440/113, 1

[56] References Cited

U.S. PATENT DOCUMENTS

| | | | |
|---|---|---|---|
| 4,552,103 | 11/1985 | Bahtz et al. | 123/424 |
| 4,732,125 | 3/1988 | Takizawa | 123/422 |
| 4,873,958 | 10/1989 | Abe | 123/424 |
| 4,970,280 | 12/1988 | Iurehara et al. | 123/422 |

Primary Examiner—Raymond A. Nelli
Attorney, Agent, or Firm—Ernest A. Beutler

[57] ABSTRACT

An arrangement for insuring that an internal combustion engine of an outboard motor will operate efficiently under all trim adjusted conditions of the outboard motor. The trim angle is sensed and an engine system such as the timing is adjusted to provide good running in response to the trim condition. Additionally, an embodiment is disclosed wherein the ignition timing is also adjusted during initial starting so as to provide adjustment of the ignition in response to both the starting condition and the trim condition.

12 Claims, 14 Drawing Sheets

IGNITION TIMING CONTROL FOR OUTBOARD MOTOR

CROSS REFERENCE TO RELATED APPLICATION

This application is a continuation in part of our application Ser. No. 325,294, filed Mar. 17, 1989, entitled "Ignition Timing Control System For Outboard Engine", and assigned to the assignee of this application.

BACKGROUND OF THE INVENTION

This invention relates to an ignition timing control for an outboard motor and more particularly to an improved timing control that will adjust the timing in response to a variety of engine running conditions and also in response to the trim of the outboard motor so as to provide stable running regardless of the engine parameters and trim angle adjustment.

As is noted in our copending application, the normal practice with outboard motors is to mount them on the transom of the associated watercraft for adjustment of the trim angle of the outboard motor and particularly its propulsion unit so as to provide optimum running under all conditions. Although the adjustment of the trim angle of the propulsion unit improves the efficiency of the propulsion unit, changes in the trim angle can adversely effect the running of the engine. For example, if the engine employs a carburetor, the adjustment of the trim angle can change the head between the fuel bowl and the discharge nozzle and can adversely effect the running of the engine. Our copending application discloses several embodiments for improving the running of the engine under conditions of significant changes in trim condition.

However, it has been found that the trim adjustment of the outboard motor can effect running even if only small trim changes are made. This is particularly true when the engine is running at slow speeds or with the throttle in a relatively closed position. At low speeds or low throttle openings, the flow through the induction passage is quite slow and the fuel tends to flow along the walls of the induction passage rather than being primarily vaporized centrally therein. This is true regardless of whether the engine is carbureted or has a fuel injection system. Depending upon whether the induction system is at the front or the rear of the engine, the trim angle can cause the engine to run either rich or lean as the trim is adjusted. This, of course, can provide uneven and undesirable running characteristics.

It is, therefore, a principal object of this invention to provide an improved control system for an outboard motor wherein the running is optimized under all running conditions and trim conditions.

It is a further object of this invention to provide an improved engine control for an outboard motor that is responsive both to engine running conditions and trim angle under substantially all circumstances.

It is a further object of this invention to provide an improved ignition control system for an outboard motor so as to promote good running under all running conditions and under all trim conditions.

In addition to the steady state running of an engine, even the starting of an engine can be effected by the trim angle at which the outboard motor is positioned. Obviously, if the trim angle and location of the induction system is such that fuel tends to flow by gravity away from the combustion chambers rather than toward them, then the starting can be effected.

It is, therefore, a still further object of this invention to provide an improved arrangement for controlling the starting of an engine in response to its trim condition.

SUMMARY OF THE INVENTION

A first feature of this invention is adapted to be embodied in an engine control for an outboard motor that is adapted to be mounted for trim adjustment of the position of the outboard motor. The engine has a manual control for operator adjustment of the speed of the engine and at least one of a fuel system and an ignition system that is controlled by the manual control. In accordance with this feature of the invention, means are provided for sensing the trim condition of the engine and for adjusting the manually controlled system of the engine in response to the sensed trim condition to maintain normal running even when the trim condition is changed.

Another feature of the invention is also adapted to be embodied in an engine control for an outboard motor that is adapted to be mounted for trim adjustment of the position of the outboard motor. The engine has at least one of a fuel system and an ignition system and also has means for starting the engine. In accordance with this feature of the invention, there is provided means for sensing the trim condition of the engine and means for adjusting the system of the engine in response to the sensed trim condition upon starting.

DETAILED DESCRIPTION OF THE PREFERRED EMBODIMENTS OF THE INVENTION

Figure 1:
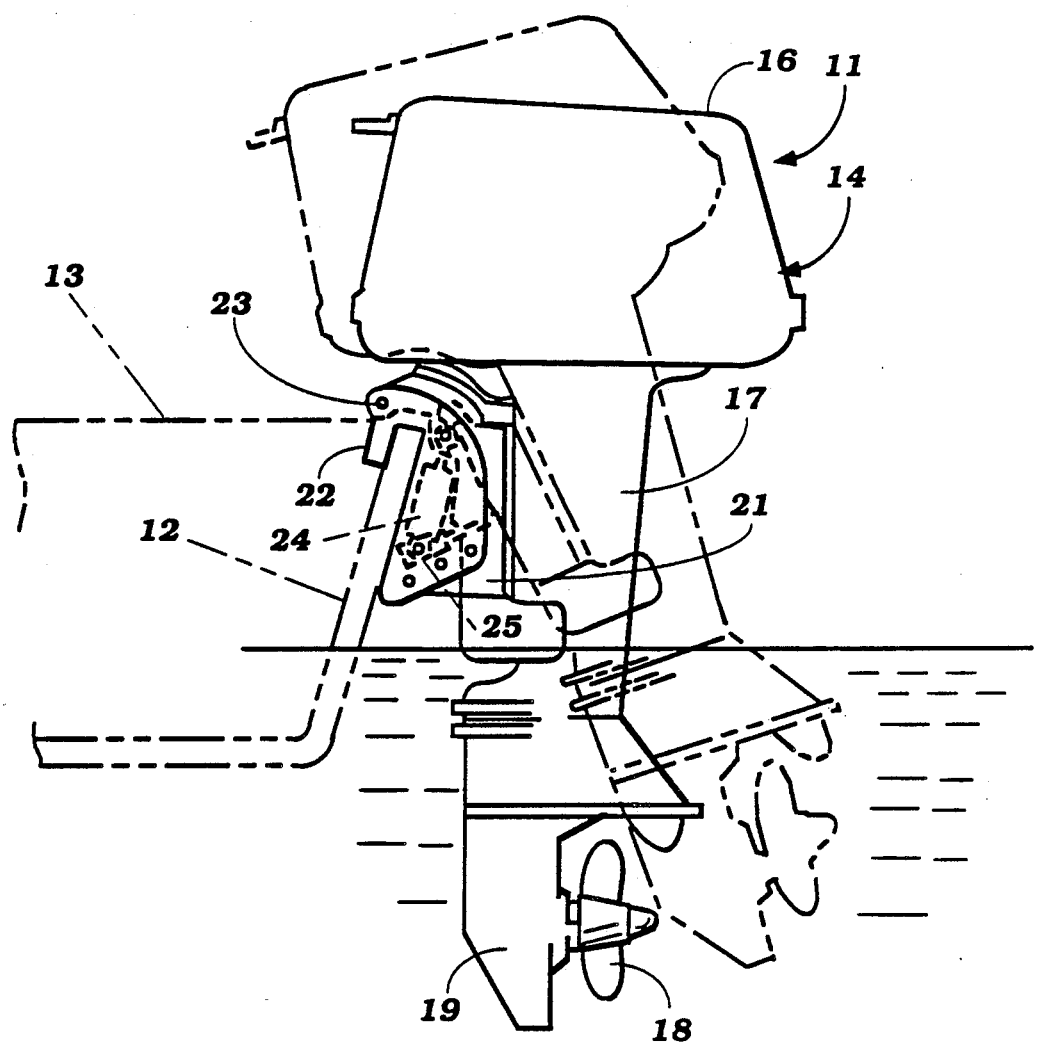
FIG. 1 is a side elevational view of an outboard motor as mounted on the transom of a watercraft and incorporating an embodiment of the invention.
Figure 2:
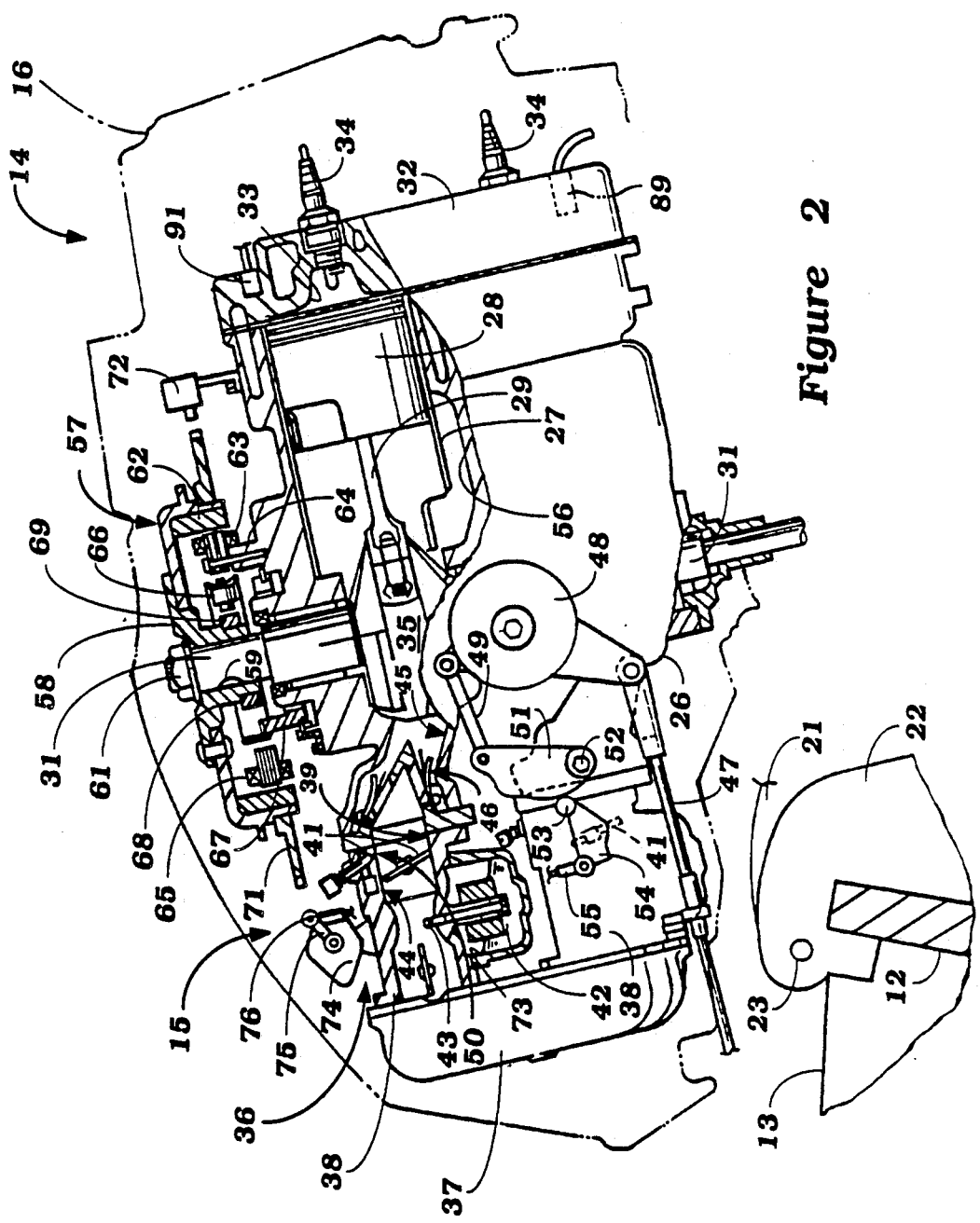
FIG. 2 is an enlarged side elevational view of the power head and mounting arrangement, with portions broken away and other portions shown in section.

Referring first to FIG. 1, an outboard motor, indicated generally by the reference numeral 11 and which has a control system constructed in accordance with an embodiment of the invention is mounted on a transom 12 of a watercraft 13. The outboard motor 11 is comprised of a power head, indicated generally by the reference numeral 14 and which comprises an internal combustion engine 15 as shown in FIG. 2 and a surrounding protective cowling, shown in phantom in this figure and identified by the reference numeral 16. As will be described in more detail, the engine 15 has an output shaft that drives a drive shaft journaled in an appropriate manner in a drive shaft housing 17 and which drives a propeller 18 of a lower unit 19 through an appropriate forward, neutral, reverse transmission (not shown).

A steering shaft (not shown) is affixed to the drive shaft housing 17 and is journaled for steering movement about a generally vertically extending steering axis within a swivel bracket 21. The swivel bracket 21 is, in turn, connected for pivotal movement to a clamping bracket 22 by means of a pivot pin assembly 23 for tilt and trim adjustment of the outboard motor 11.

In order to effect this tilt and trim adjustment, there is provided a tilt cylinder assembly 24 that is interposed between the clamping bracket 22 and the swivel bracket 21. In addition, there is provided a trim motor 25 that is carried by the clamping bracket 22 and which operates with the swivel bracket 21 so as to effect trim adjustment. The trim adjustment of the outboard motor 11 is through a relatively narrow range as shown by the solid and phantom line figures in FIG. 1 so as to adjust the angle of attack of the propeller 18 relative to the transom 12 so as to accommodate different running conditions and provide the optimum thrust. The tilt fluid motor 24 may be operated so as to raise the outboard motor 11 to an elevated out of the water condition. The hydraulic systems employed for this purpose are well known and since they form no part of the invention, description of them is not believed to be necessary to understand the operation of the invention.

Referring now in detail to FIG. 2, the internal combustion engine 15 is depicted as being of the two cylinder in line, crankcase compression, two cycle type. It is to be understood, of course, that the invention may be utilized in conjunction with other types of engines than two cycle type and also engines having different numbers of cylinders, different cylinder configurations and, in fact, rotary type engines.

In the illustrated embodiment, the engine 15 is comprised of a cylinder block 26 in which a pair of cylinder liners 27 (only one of which appears in this figure) extend in a horizontal direction, as is conventional outboard motor practice, to slidably support a respective piston 28. Each piston 28 is connected by means of a respective connecting rod 29 to a crankshaft 31 which rotates about a generally vertically extending axis and which drives the drive shaft, as aforenoted.

A cylinder head 32 is affixed to the cylinder block 26 in a known manner and defines a pair of recesses 33 each of which cooperates with a respective one of the cylinder bores and pistons 28 so as to define the combustion chamber. A spark plug 34 is mounted in the cylinder head 32 with its gap extending into the combustion chamber recess 33 for each cylinder.

The crankshaft 31 is rotatably journaled in a crankcase formed by the cylinder block 26 and which is formed with individual sealed chambers 35 for each piston 26. A fuel/air mixture is delivered to these chambers 35 by means of an induction and charge forming system, indicated generally by the reference numeral 36. This induction and charge forming system includes an air inlet device 37 that draws air from within the protective cowling 16 and delivers it to a pair of carburetors 38. Each carburetor 38 is comprised of a respective induction passage 39 in which a flow controlling throttle valve 41 is supported in a known manner. A fuel bowl 42 is maintained with a constant head of fuel by means of a float operated valve and supplies fuel to a main discharge nozzle 43 that is positioned in a venturi section of the induction passage of the carburetor 38 upstream of the throttle valve 42. In addition, the carburetors 38 are provided with an idle and transition fuel discharge circuit 44 of a known manner. An idle adjusting screw 50 is provided for adjusting the flow of the idle discharge circuit.

The carburetors 38 deliver the fuel/air mixture to an intake manifold having individual runners 45 that discharge into the crankcase chambers 35. Reed type check valves 46 preclude reverse flow through the manifold runners 45, as is well known in this art.

The position of the throttle valves 41 and, accordingly, the speed of the engine 15 is controlled by a throttle control system including a throttle control cable 47 that extends to a remotely positioned throttle actuator (not shown) and which rotates a throttle controlled drum 48 that is journaled on the cylinder block 26 in an appropriate manner. A control link 49 is pivotally connected at one end to the drum 48 and at the other end to a control cam 51 which is, in turn, journaled upon the intake manifold by means of a pivot pin 52. The throttle control cam 51 cooperates with a follower 53 that is affixed to a lever 54 which is, in turn, affixed to the shaft of the throttle valve 41 for positioning the throttle valve 41 upon rotation of the cam 51. The throttle valves 41 of the respective carburetors are connected to each other for simultaneous movement by means of a link 55 that is pivotally connected to the throttle control levers 54 of the respective carburetors.

The fuel/air charge which is delivered to the crankcase chambers 35 by the carburetors 38 is transferred upon descent of the pistons 28 into the combustion chambers 33 by transfer or scavenge passages 56 in a known manner. At the appropriate time, as will become apparent, the spark plugs 34 are fired by an ignition system. The firing power for the spark plugs 34 is derived from a magneto generator, indicated generally by the reference numeral 57 and which includes a flywheel 58 that is affixed to the crankshaft 31 for rotation with it by a key 59 and nut 61. The flywheel 58 carries a plurality of permanent magnets 62 that cooperate with a charging coil 63 that is affixed to a boss 64 of the cylinder block 26 in proximity thereto. In addition, the magneto generator 57 may include generating coils 65 for charging a battery (not shown) in a known manner.

There is provided further a trigger or pulser coil 66 that is mounted on a mounting ring 67 and which cooperates with magnet segments 68 and 69 so as to provide a signal when the crankshaft 31 is at a particular crank angle, which may be considered to be the fixed timing angle for the engine.

The engine 15 may also be provided with an electric starter including a starter ring gear 71 that is affixed to the flywheel 58 and which is driven by a suitable starter motor (not shown). A further sensor coil 72 may be associated with the teeth of the starter gear 71 for providing a signal that is indicative of the actual rotational angle of the crankshaft 31, for a reason to be described.

As has been noted, the outboard motor 11 is supported for trim adjusting movement and FIG. 2 of the drawings shows the engine 15 in a condition when the outboard motor 11 is adjusted to its maximum trim up condition as shown in the phantom line view of FIG. 1. As may be seen, the fuel level 73 in the fuel bowl 42 will shift as the trim adjustment changes and this will change the head of fuel for both the main discharge nozzle 43 and also the idle and transition system 44. As a result, the running of the engine can be changed by changing of the trim angle of the outboard motor 11.

In addition to changing the head of the fuel between the discharge nozzle 43 and the fuel bowl 42, trim adjustment will also effect the angular inclination of the induction passage 39. Particularly at low running speeds and low throttle openings, this angular inclination will also effect the air/fuel ratio. Since the fuel generally flows along the walls of the induction passages 39 at low speeds, the fuel will have to flow uphill at a greater angle when the trim angle is increased This can cause a leaning of the fuel/air mixture In accordance with the invention, there is provided an arrangement wherein the timing of the firing of the spark plugs 34 is adjusted in response to a variety of parameters so as to insure even running under all these conditions.

One of the parameters for controlling the timing is the throttle valve position or air flow. There is, therefore, provided an air flow sensor, indicated generally by the reference numeral 74 which is comprised of a potentiometer type device that has an input arm 75 that is connected by a link 76 to the throttle valve actuating link 55 so as to provide an output signal indicative of position of the throttle valves 41 and, accordingly, the air flow to the engine.

Figure 3:
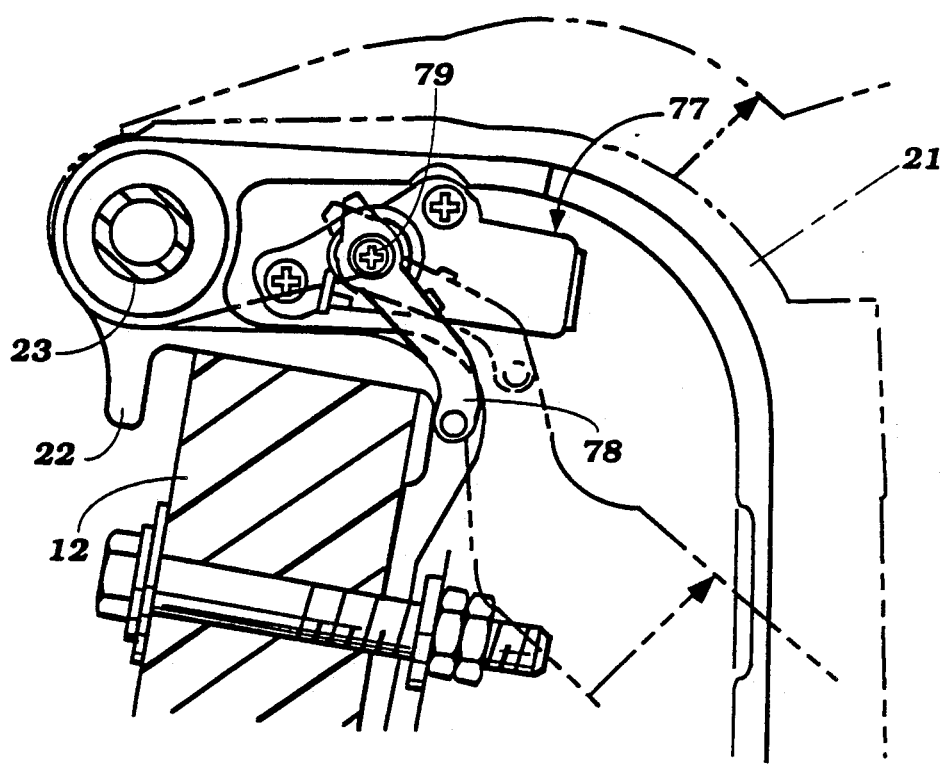
FIG. 3 is a still further enlarged cross-sectional view showing the trim angle sensor.

This sensing system includes further a trim position sensor, indicated generally by the reference numeral 77 and shown in most detail in FIG. 3. The sensor 77 is also a potentiometer type of device and is affixed to the swivel bracket 21 and has a wiper arm 78 that is affixed to a shaft 79 of the device 77 and which engages the transom 12 clamping bracket 23 so as to provide an output signal indicative of trim adjusted position.

Figure 4:
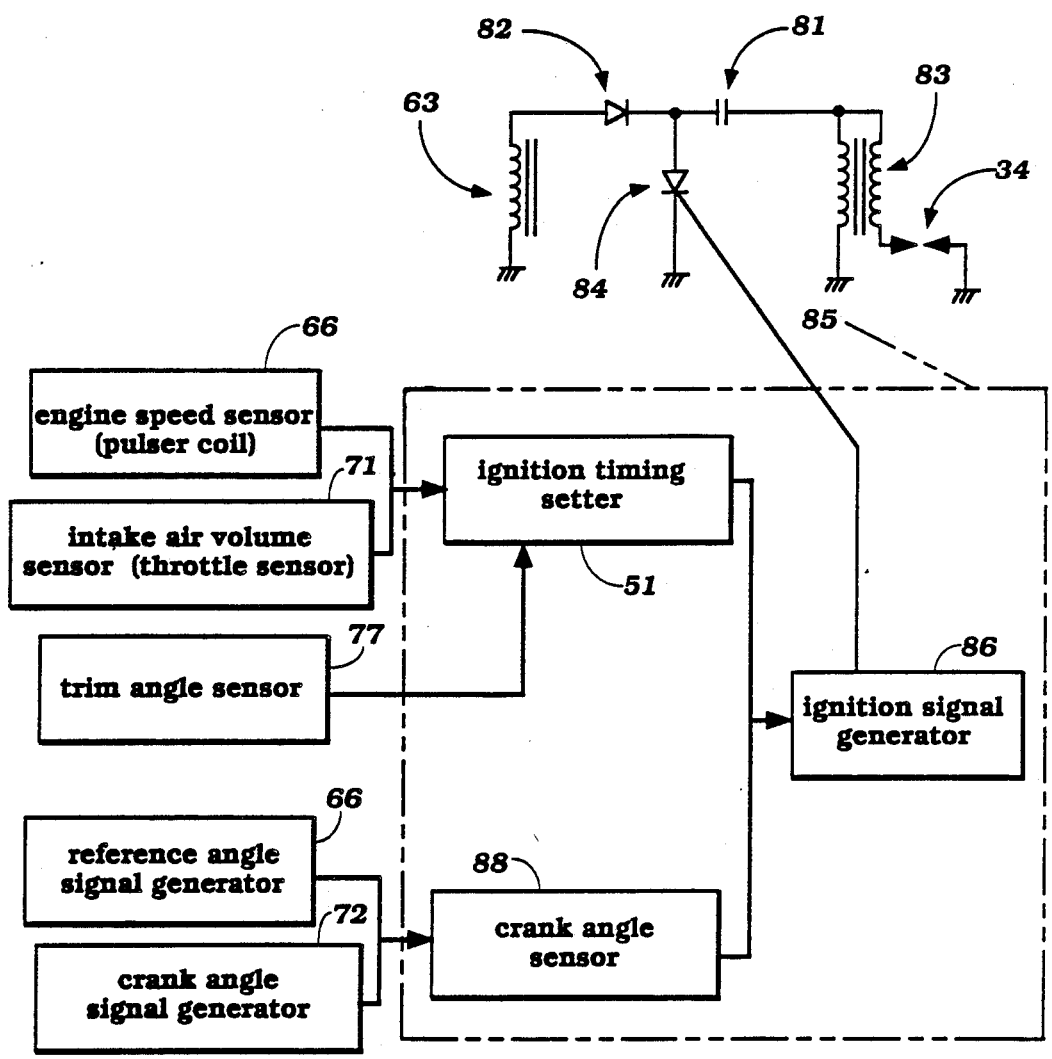
FIG. 4 is a schematic view showing the ignition control.

How these inputs are related to the ignition timing may be best understood by initial reference to FIG. 4 wherein the ignition system and control system for the engine is depicted.

The ignition system is of the SCR capacitor discharge type and includes a charging capacitor 81 that is charged by the charging coil 63 through a rectifying diode 82. The charging capacitor 81 is in circuit with a primary winding of an ignition coil 83, the secondary winding of which is in circuit with the spark plug 34. When the charging capacitor 81 is charged by the charging coil 63, it may be discharged by activating an SCR 84 by appropriately controlling its gate so as to ground the circuit and permit the capacitor 81 to discharge and induce a voltage in the secondary winding of the coil 83 sufficient to fire the spark plug 34.

The timing of the firing of the spark plug 34 is controlled by means of a controller system, indicated generally by the reference numeral 85 and which includes an ignition signal generator 86 that appropriately gates the SCR 84 to fire the spark plug 34 at the appropriate time.

The inputs to the controller 85 include the output signal from the pulser coil 66 which, in one condition indicates the engine speed and this engine speed along with the throttle opening as determined by the sensor 74 or air flow is fed into an ignition timing setter 87. The ignition timing setter 87 also receives a signal from the trim angle sensor 77 so as to appropriately adjust the timing of the ignition depending on the trim angle, in the manner to be described.

In addition to the information regarding engine speed, air intake volume or throttle position and trim angle, there is also provided a crank angle signal to the ignition signal generator from a crank angle sensor 88. The crank angle sensor 88 receives information from the sensor 72 of crank angle as well as the information from the pulser coil 66 and outputs its signal to the ignition signal generator 86 so that the ignition signal generator will generate the spark firing at the appropriate time depending upon the aforenoted variables.

In addition to the inputs already described, the ignition timing setter 87 may also adjust the ignition timing in response to certain other parameters of the engine such as its temperature as indicated by a temperature sensor 89 (FIG. 2). Furthermore, there may be provided a knock detector 91 which is also mounted in the cylinder head 32 and which can provide an output signal to the system so as to avoid knocking. The invention, however, is directed primarily toward the arrangement by which the ignition timing is adjusted in response to trim angle and it is believed obvious that those skilled in the art will understand how to apply this principle to any known type of ignition systems having controls for the aforenoted purposes.

Figure 5A:
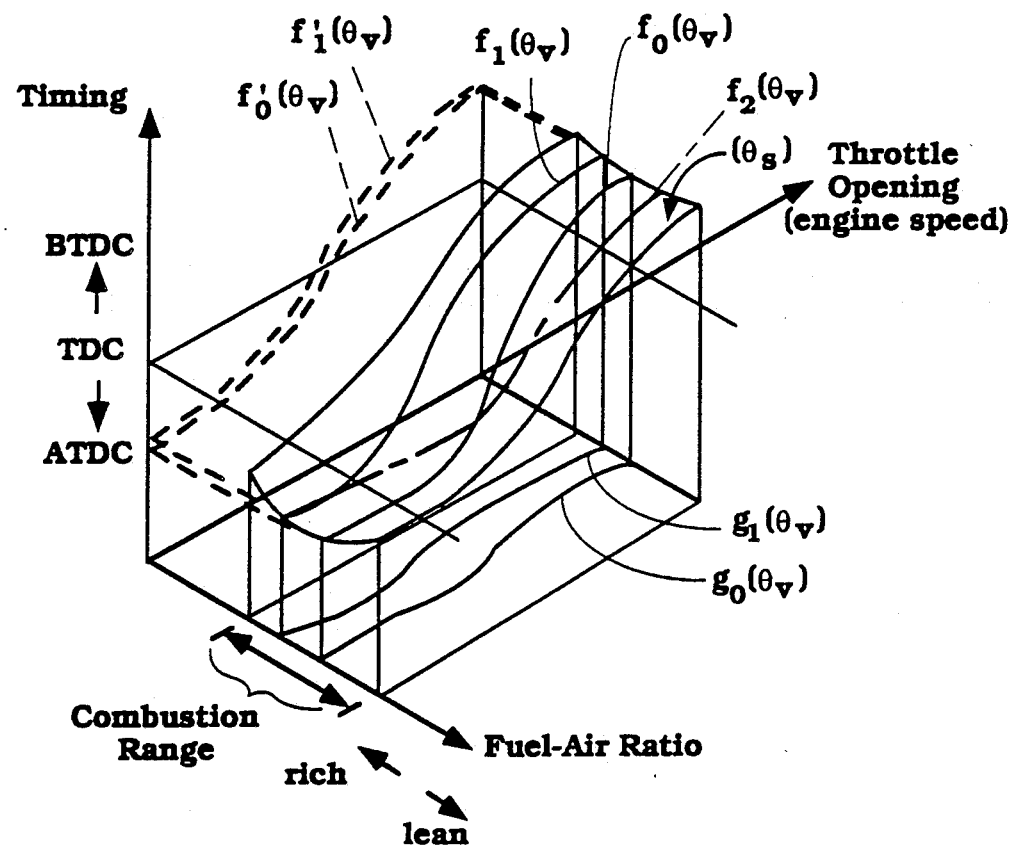
FIG. 5A is a graphical view showing the relationship of optimum ignition timing with respect to throttle position and air/fuel ratio.
Figure 6:
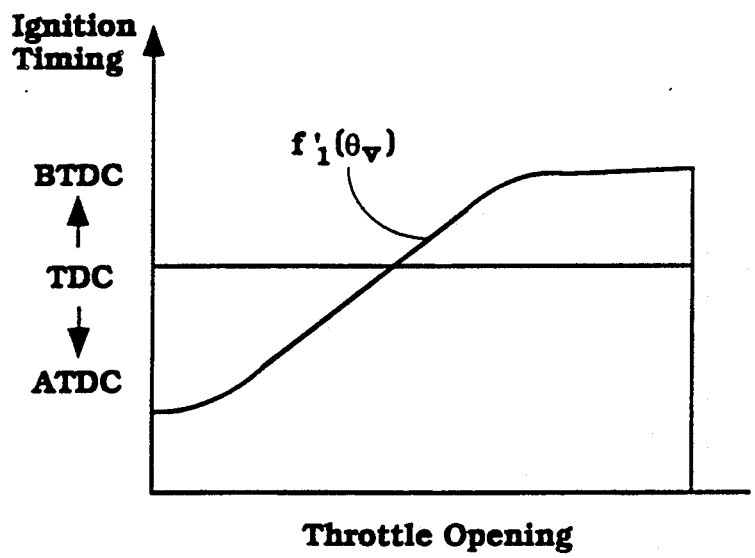
FIG. 6 is a graphical view showing the relationship of spark timing to throttle opening.
Figure 5B:
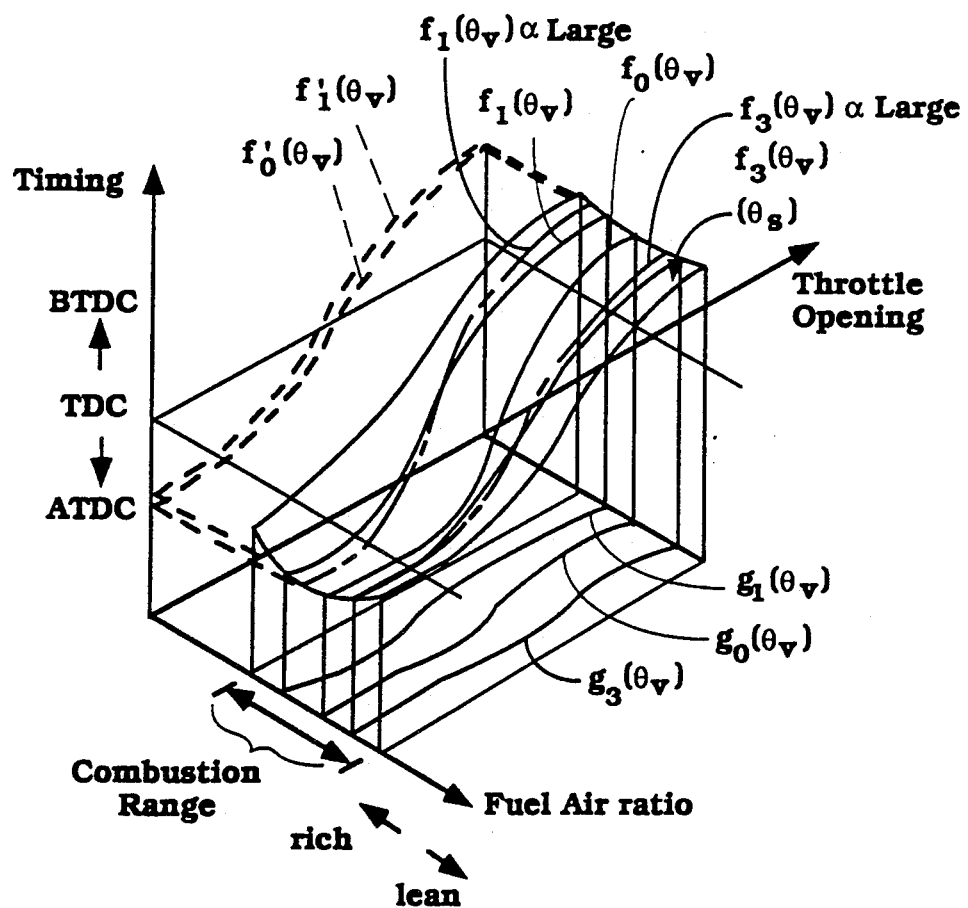
FIG. 5B is a graphical view, in part similar to FIG. 5A, and further shows the effect or curves followed in response to conditions when there is a variation in the trim angle.

FIGS. 5A and 5B are three dimensional, graphical analyses that show how the various factors aforenoted determine the desirable spark timing. FIG. 5A shows these parameters while FIG. 5B also shows the effect of trim angle on the parameters. There is shown the optimum spark timing curve in relation to throttle opening or engine speed and also the fuel/air mixture ratio. The fuel/air mixture ratio, as aforenoted, will vary with the trim angle and it can be seen that the optimum spark timing depends upon all of these variables. During a central portion of the range for the air/fuel ratio which covers normal trim condition, the spark timing curve is as shown in FIG. 6 which constitutes a development of the spark timing curve on the XY plane having the throttle opening on the ordinate and the spark timing on the abscissa. As is typical, the optimum spark advance is at a first amount during low engine speeds, the spark advance progressively increases as the engine speed increases and then is held constant at a speed something less than maximum engine speed. Within a narrow range of the optimum fuel/air ratio, the spark timing curve generally follows the same pattern and does not deviate significantly. However, as the air/fuel ratio moves off toward the rich or lean side from the center point, a result of adjustment of the trim position, the optimum spark timing actually calls for an advance from the normal spark timing. The system, as will now be described, is effective to provide this advance in spark timing so as to insure good running under all conditions.

Figure 7:
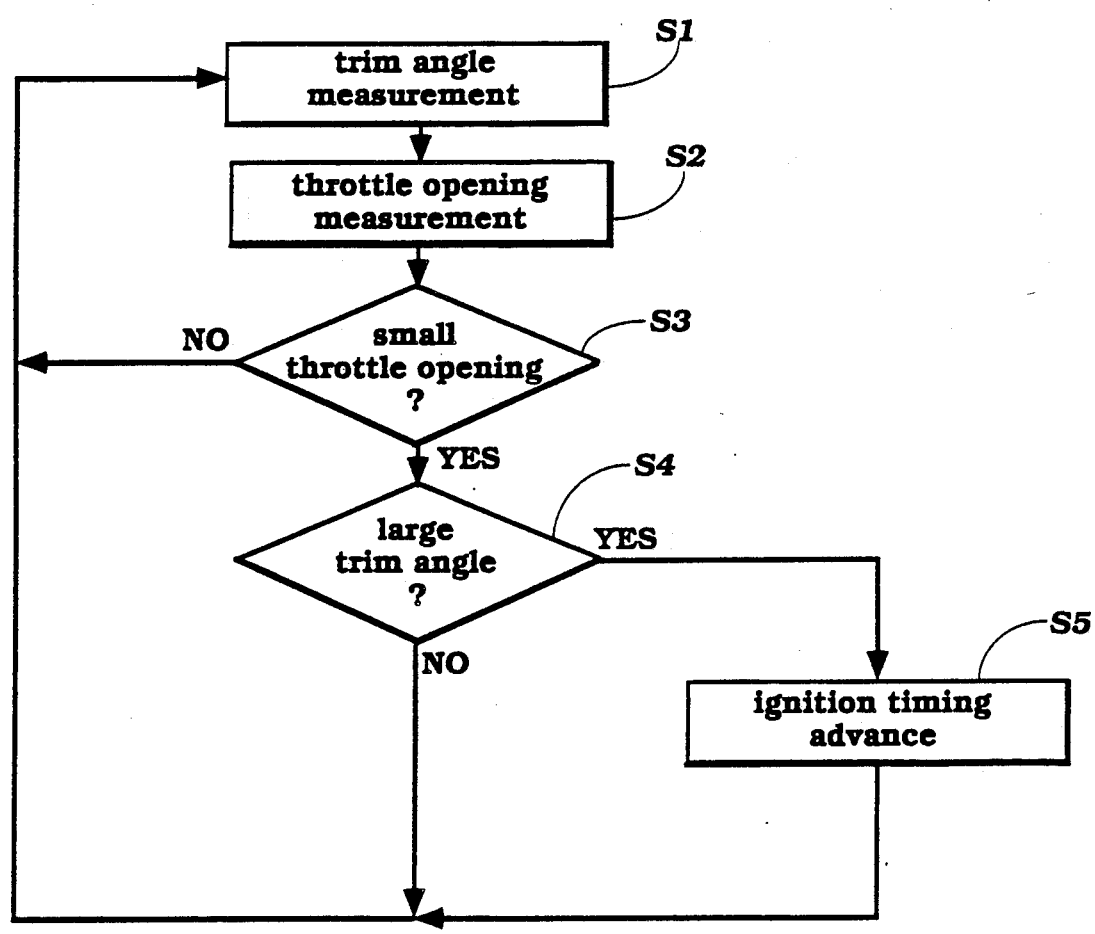
FIG. 7 is a block diagram showing the operation of an embodiment of the invention.

One possible routine of operation by which the spark advance may be accomplished is shown in FIG. 7. The basic operation of the embodiment as shown in FIG. 7 is that the trim angle and throttle opening are measured and if the throttle opening is large indicating that there is a likelihood that significant ignition timing adjustment is not required, the system will not provide any spark advance over the normal spark advance. However, if the throttle opening is small and the trim angle variation is large, then the spark timing will be adjusted.

Referring specifically to this figure, at the step S1 there is made a reading of the trim angle from the trim angle sensor 77. Simultaneously or after this, there is made a reading of the throttle opening or engine speed from the sensor 74. If it is determined that the throttle opening is large, the program moves at the step S3 back to the start step S1. If, however, the throttle opening is small, then at the step S4 the trim angle is compared to determine if there has been a large deviation in trim angle. If there is, the program moves to the step S5 so as to adjust the timing in accordance with the curve shown in FIG. 5B. If, however, there is not a large trim angle variation, it is determined that the air/fuel ratio will be within the acceptable range and no spark advance is accomplished.

Figure 8:
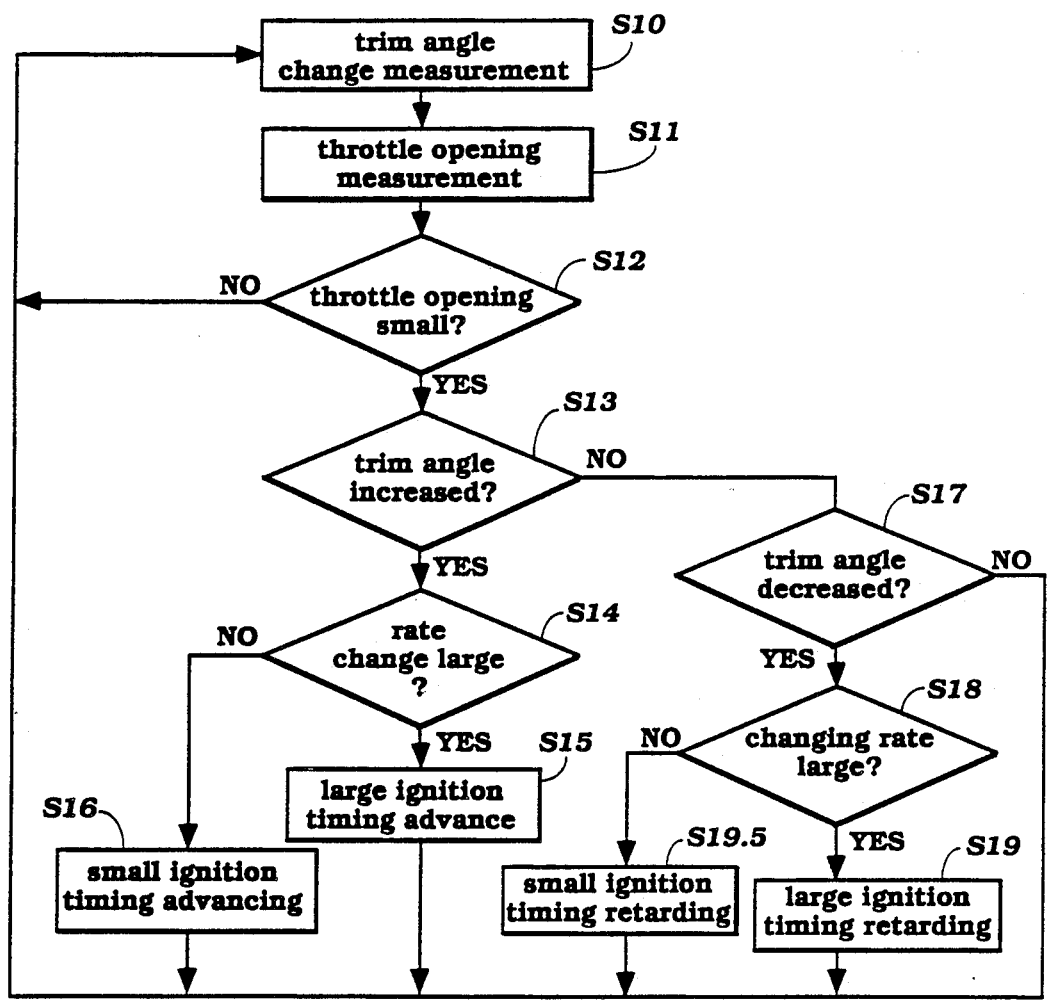
FIG. 8 is a block diagram showing the operation of another embodiment of the invention.

FIG. 8 shows another possible routine of operation wherein the same basic concept is followed, but in this case the rate of change of the trim angle is measured and if the rate of change of trim angle is large then the spark timing is changed at a rapid rate, whereas if the rate of change is small the spark is changed at a more reduced rate.

Referring in detail to FIG. 8, at the step S10 the trim angle is measured and at the step S11 the throttle opening is measured. At the step 512 if it is determined that there is not a small throttle opening, for the reasons as aforenoted the program moves back to the step S10 and repeats.

If, however, the sensor 74 has indicated that there is a small throttle opening the program moves to the step S13 to see if the trim angle is being increased.

If it is determined at the step S13 that the trim angle is being increased, the program moves to the step S14 to see if the rate of change is large or small. If the rate of change is large, the program moves to the step S15 to advance the ignition timing in a large degree and at a rapid rate. If, however, the rate of change is small, then the program moves to the step S16 so as to cause a slight ignition timing advance.

If at the step S13, it is determined that the trim angle is not being increased the program moves to the step S14 to determine if the trim angle is being decreased. If it is not, the program moves back to the start. If, however, it is determined that the trim angle is being decreased, the rate of change of trim angle is determined at the step S18. If the rate of change is large, then the program moves to the step S19 to provide a large ignition timing retard. If, however, the rate of decrease is small the program moves to the step S19.5 so as to cause a slight ignition retardation.

Figure 9:
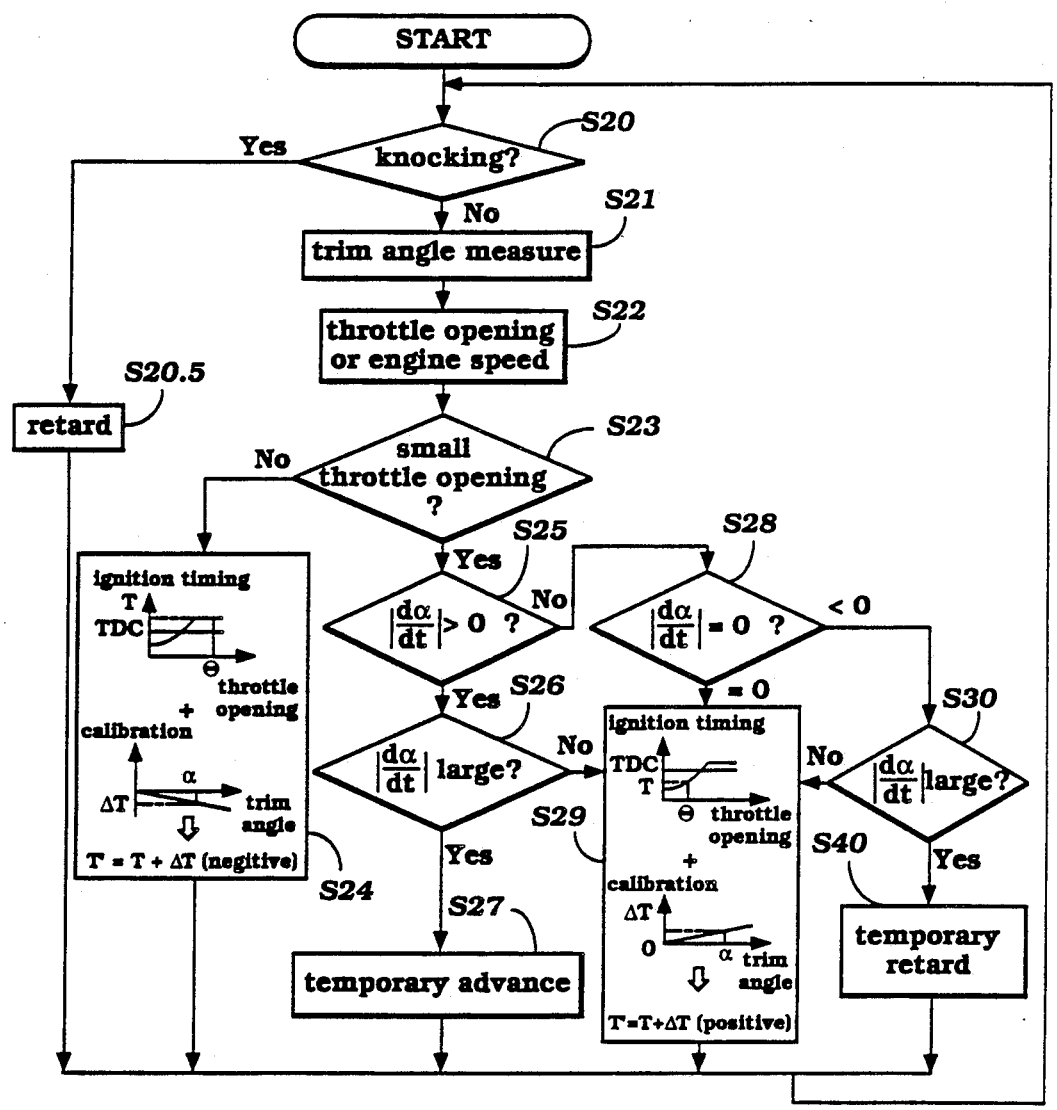
FIG. 9 is a block diagram showing another embodiment of the invention and the control routine therefor.

In the embodiments of the invention as thus far described, control to provide smooth running in response to trim angle changes has been generally limited to situations wherein there is a significant degree of trim angle change. However, even minor degrees of trim angle change can effect the running of the engine for the aforenoted reasons. FIG. 9 shows a routine by which the ignition timing can be controlled so as to provide good running under all conditions including changes in trim angle which may be relatively minor. Referring to this figure, once the program starts, it first moves to the step S20 to determine if the knock sensor 89 has outputted a signal indicative of knocking. If so, the program moves to the step S20.5 and retards the spark, then returns.

Assuming that a knock condition has not been determined at the step S20, the program moves to the step S21 to measure the trim angle by means of the trim angle sensor 77 and then measures either engine speed or throttle valve opening at the step S22. At the step 23 it is determined if the throttle opening is large or small. A small throttle opening is a throttle opening position wherein the effect of the trim angle changes could have a significant effect on the air/fuel ratio of the engine due to the aforenoted factors of inclination of the induction passage.

If it is determined that the throttle opening is not small at the step 23, the program moves to the step 24 wherein the appropriate ignition timing is set. The ignition timing T' is determined by the following relationship:

$$T' = T + \Delta T$$

In the foregoing equation, T is the basic spark timing determined by a spark timing curve in relation to throttle opening while $\Delta T$ is a calibration factor determined from a calibration curve that is dependent upon trim angle. It should be noted that as the trim angle increases the timing is retarded. That is, $\Delta T$ is a negative factor. This is due to the fact that the greater the trim angle, the steeper the incline that the fuel must flow up, and the increased difference in height between the discharge nozzle and the fuel in the fuel bowl accordingly calls for a retarded timing.

If, however, it is determined at the step S23 that the throttle opening or engine speed is low, then a determination is made at the step S25 to determine if the trim up condition is still being encountered. That is, a determination is made as to whether $da \div dt$ is greater than 0.

If it is determined at the step 25 that the outboard motor is still being trimmed up, the program moves to the step 26 to determine if the rate of change of the trim up is being accelerated as indicated by integrating the rate of change of the trim angle curve with respect to time. If rapid trim up is being encountered, the program moves to the step S27 wherein a temporary spark advance is accomplished.

If, however, at the step S26 it is determined that the rate of trim up is relatively small, the program moves to the step S29 wherein the timing is set in a manner as will be described. If at the step 25 it is determined that the outboard motor 11 is not being trimmed up, that is $da \div dt$ is not greater than 0, the program then moves to the step 28 to determine if trim up has stopped. That is, it is determined if $da \div dt$ is equal to 0. If it is equal to 0, then the program moves to the step 29 to set the permanent timing in accordance with the equation $T' = T + \Delta T$ in accordance with this step. The $\Delta T$ in this step is, however, a spark advance as opposed to a spark retard.

If, however, at that step 28 it is determined that the change in trim angle is less than 0, this is an indication that there is a trim down condition and the program moves to the step S30 to determine if the rate of change of the trim is large or small. If it is not large, the program moves to the step S29 to set the timing in the aforedescribed manner. If, however, it is determined at the step S30 that there is rapid trim down occurring, then the program moves to the step S40 so as to provide a temporary retard in ignition timing to stabilize the running until the trim operation is either stopped or slowed.

Figure 10:
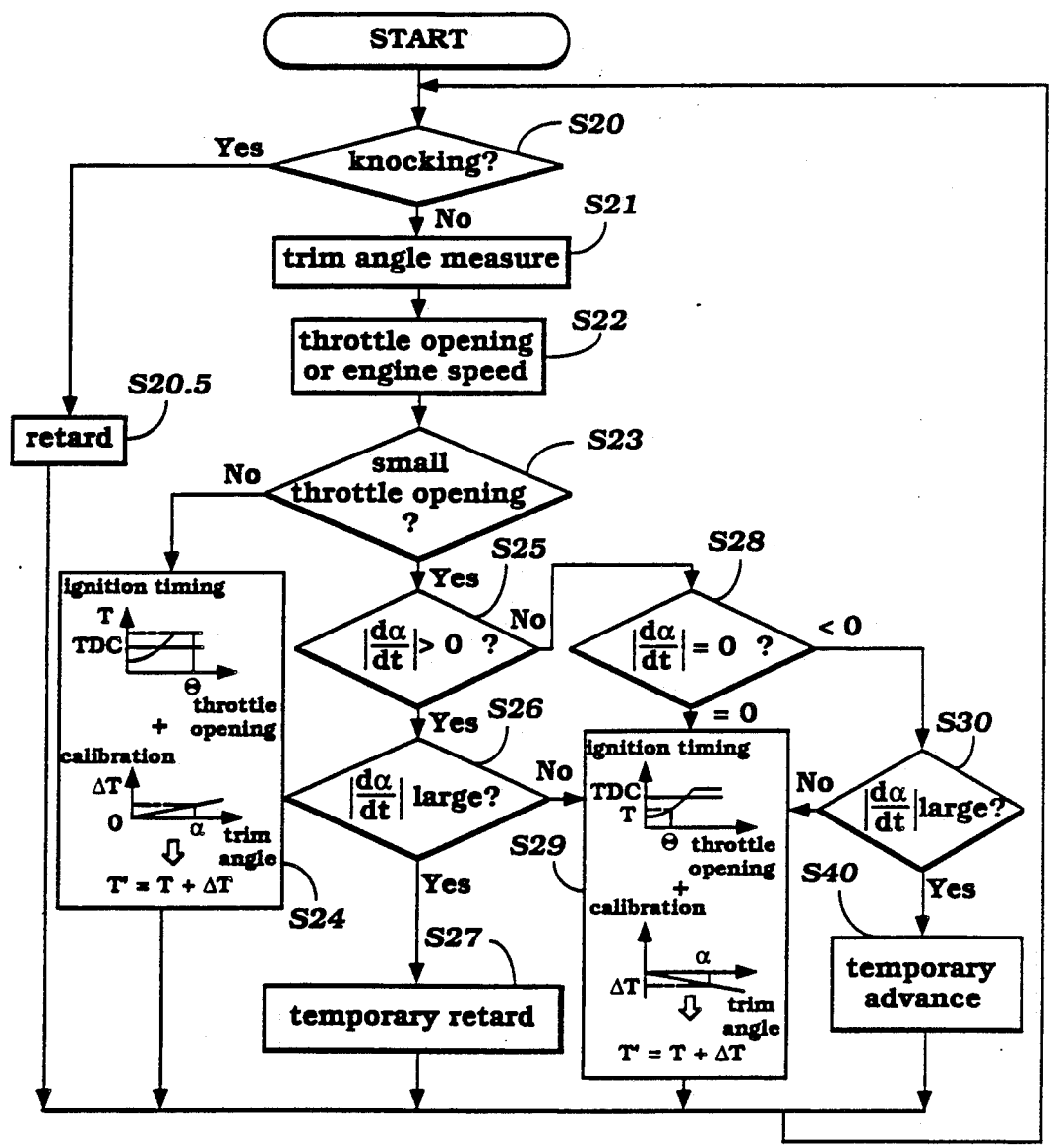
FIG. 10 is a block diagram of another embodiment of the invention and the control routine therefor.
Figure 11:
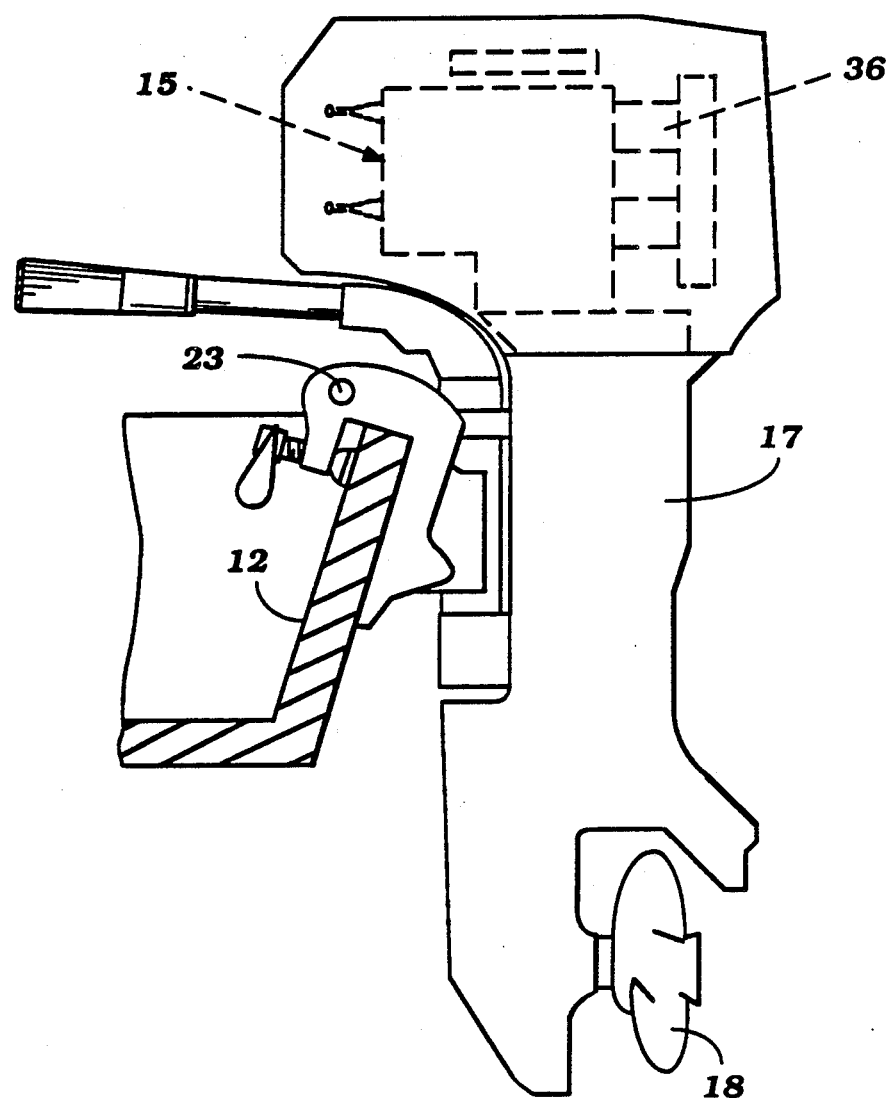
FIG. 11 is a side elevational view of an outboard motor constructed in accordance with this other embodiment of the invention.

The aforedescribed example of FIG. 9 was for an engine having an orientation as shown in FIG. 2 wherein a trim up would increase the angle through which the fuel must flow to the engine and thus tends to cause a leaning of the induction system. However, there are other engine orientations and such an orientation is shown in FIG. 11. Because of the similarity of this embodiment to the previously described embodiment, the components have been identified by the same reference numerals and will not be described again. However, it should be noted that in this embodiment, the carburetors 36 are positioned at the opposite end of the engine from the embodiment of FIG. 2. Therefore, as the engine is trimmed up, the fuel will tend to flow in a downhill fashion rather than an uphill fashion. To accommodate this, the spark timing changes must be reversed from the embodiment of FIG. 9 and FIG. 10 shows such a reversed construction. Because of the other similarities of this embodiment to the previously described embodiment, it is believed unnecessary to describe the routine thereof. However, it should be noted that the correction factor in the step S24 is a spark advance rather than a spark retard and the correction factor is step S29 is a spark retard rather than a spark advance. Also, the steps S27 and S40 provide temporary retards and advances rather than the reverse, as in the previously described embodiment. In all other regards, this embodiment is the same as those previously described. Also, it should be noted that, although the invention has been described in conjunction with carbureted engines, certain facets of the invention also have practicality with fuel injected engines. However, the actual amount of calibration required may differ depending upon the specific nature of the fuel injection system.

Figure 12:
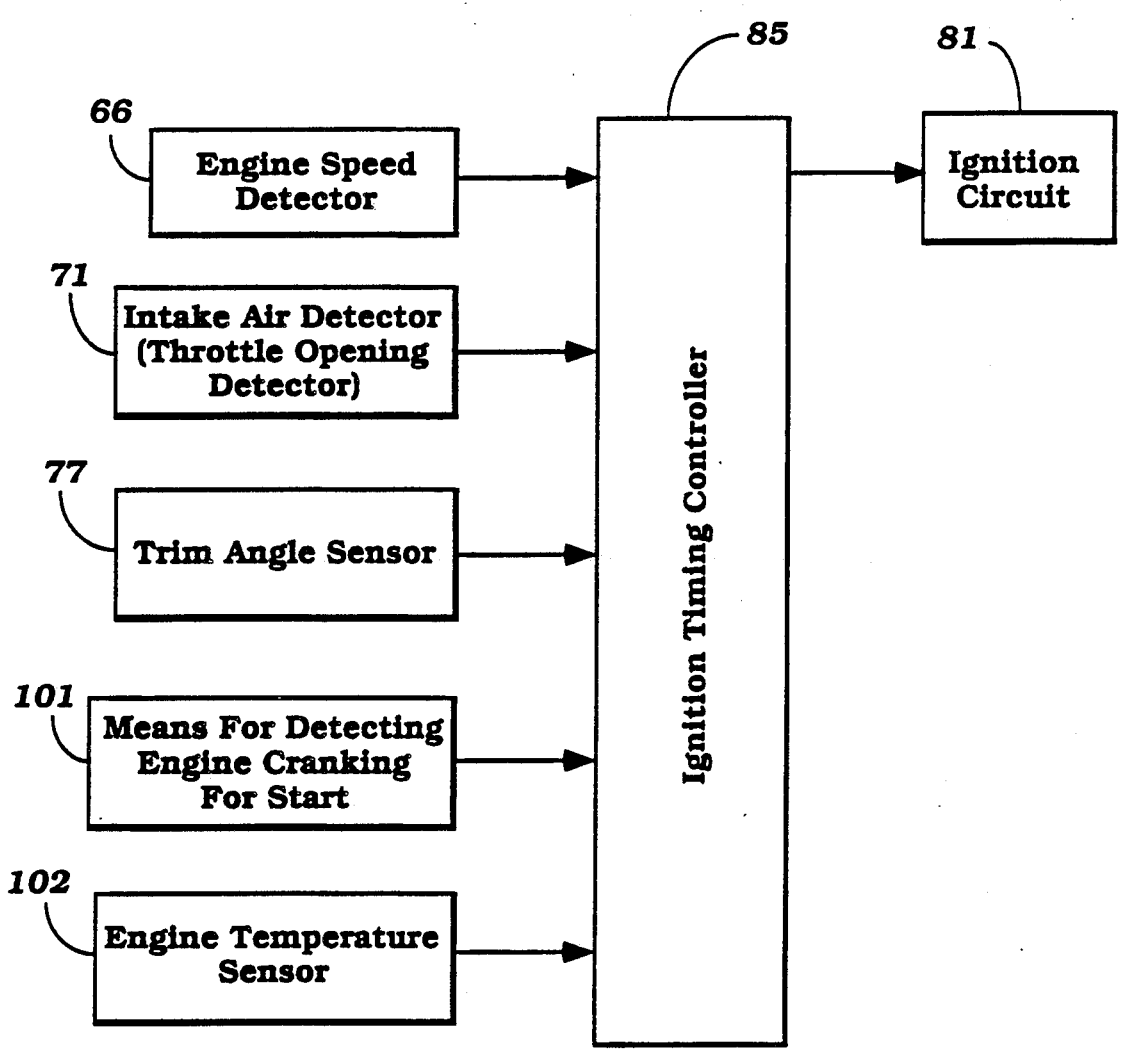
FIG. 12 is a block diagram showing the control system in accordance with another embodiment of the invention.
Figure 13:
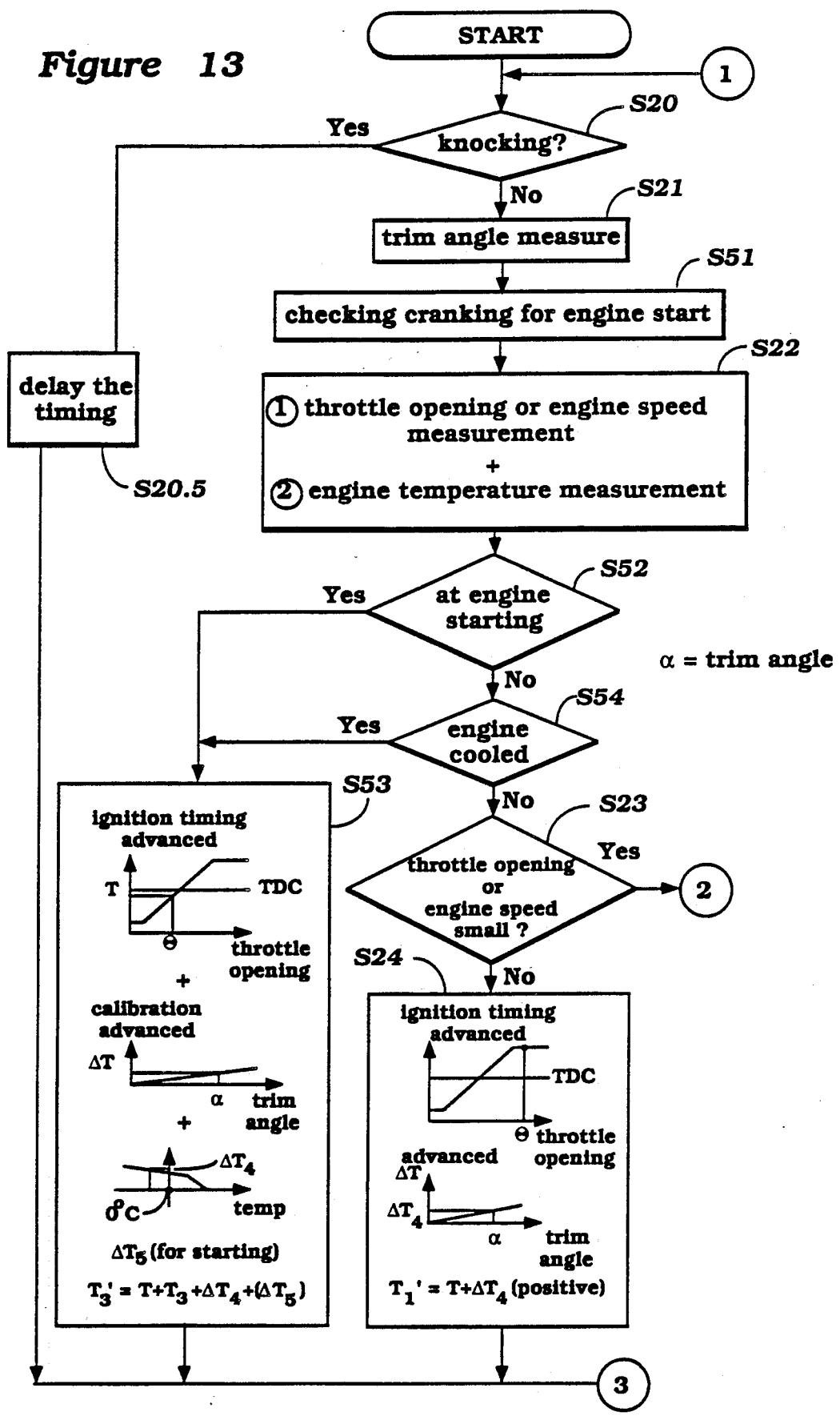
FIG. 13 is a block diagram showing the control routine in accordance with another embodiment of the invention wherein the engine starting control is adjusted in response to trim conditions.
Figure 14:
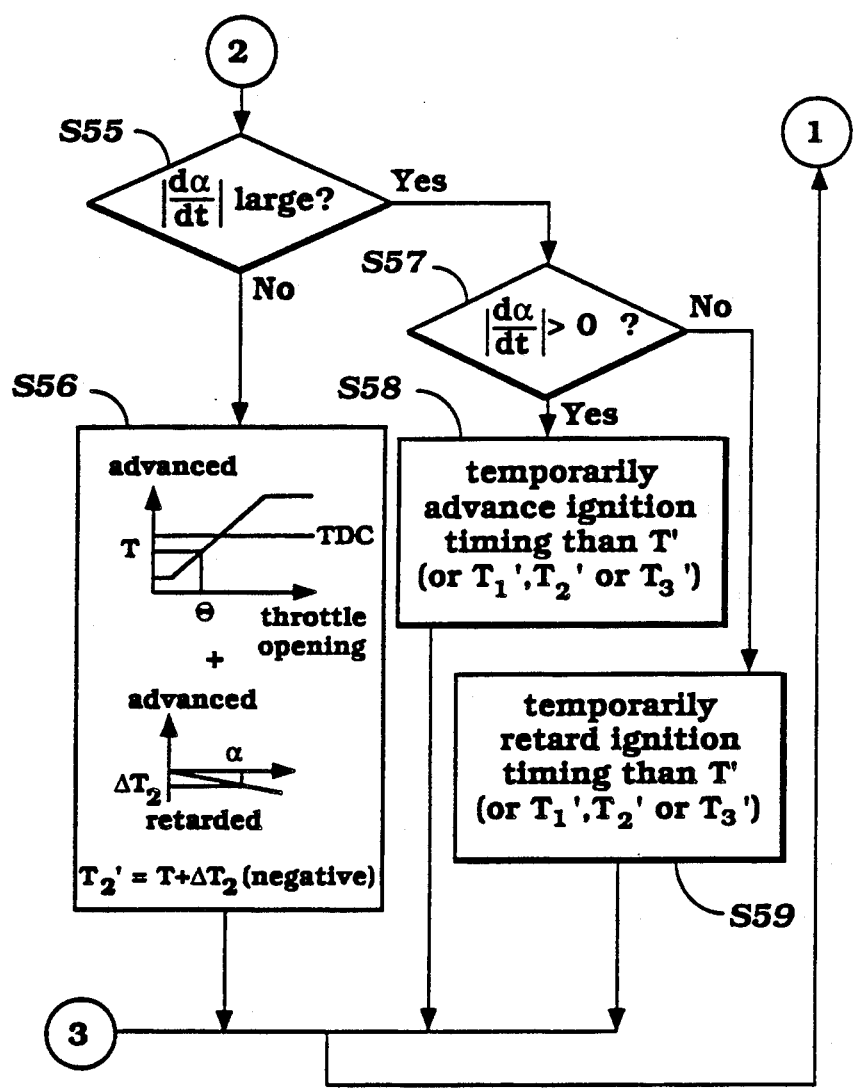

In the embodiments as thus far described, the ignition timing control has been adjusted to compensate for fuel/air variations which may be caused as a result of changes in trim angle. In addition to such running condition changes, it may also be desirable to adjust the ignition timing in response to trim angle during starting in order to assist in starting. FIGS. 12 and 13 show such an embodiment. In FIG. 12, the various components of the system are depicted in block form and include several components of the previously described embodiments. In those cases the embodiments have been identified by the same reference numerals. These controls may include an engine speed detector 66 such at the pulser coil of the ignition circuit, and air intake volume sensor 71, which may comprise the throttle angle detector and the trim angle sensor 77. In addition, there is also provided a detector 101 for detecting the occurrence of the start of engine cranking and a detector 102 that determines whether the engine temperature is cool or has reached its normal operating temperature. These signals are all outputted to the controller 85 which operates the ignition circuit 81 in a manner as generally described previously.

A routine of operation for this embodiment is illustrated in FIG. 13 and follows generally the routine of FIGS. 9 and 10, depending upon the orientation of the induction system for the engine. Where steps are the same or substantially the same as the routines in FIGS. 9 and 10, they have been identified by the same reference numerals Therefore, it will be noted that at the step S20, the existence of a knocking condition is determined. If a knocking condition is determined, the routine moves to the step S20.5 to retard the timing. If, however, knocking is not present, then the program moves to the step S21 to again measure trim angle. The routine then moves to a step S51 wherein it is determined by reading the engine crank detector 101 to see if the engine is being initially cranked. Also, the throttle opening or speed is measured at the step S22 as previously described and also at this same step the engine temperature is measured by detecting the output from the temperature sensor 102.

The routine then moves to the step S52 to determine if the engine is being started initially. If so, the program moves to the step S53 to set the spark advance in response to the various measured conditions in accordance with the following equation:

$$T'_3 = T + \Delta T_3 + T_4 + (\Delta T_5)$$

The $\Delta T'_3$ is the amount of spark advance required beyond the fixed spark advance curve for the throttle opening in question is as derived by a calibration curve experimentally obtained. In addition, the $\Delta T_4$ factor is determined by another calibration curve related to temperature. $\Delta T_5$ is a still further enrichment or priming for the condition during engine starting.

If it is determined at the step S52 that the engine is not being initially cranked, then the program moves to the step S54 to determine if the engine is below its normal operating temperature. If it is, then the program returns to the step S54 to provide the aforedescribed enrichment. However, the calibration factor $\Delta T_5$ for initial cranking is not added to the spark advance.

If, at the step S54 it is determined that the engine is at its normal operating temperature, then the routine moves to the step S23 for setting the spark timing in the manner generally previously discussed. That is, if the throttle opening is small, the program moves to the step S24 to set the spark timing in accordance with the factors previously described.

If, however, it is determined that the throttle opening is large, then the routine moves to a step S55 where a determination is made as to whether or not the trim angle change with respect to time is large. If it is not, the program moves to the step S56 wherein the spark advance is set in accordance with the following equation:

$$T'_2 = T + \Delta T_2.$$

In this embodiment, the $\Delta T$ is a spark retard determined from a calibration curve.

If, however, at the step 56 it is determined that the trim angle is being changed rapidly, then the program moves to the step S57 to determine if trim up or trim down is being experienced. If trim up is experienced, the $da \div dt$ will be positive and the program moves to the step S58 so as to provide a temporary spark timing advance which will be greater than those determined by the foregoing factors. If, on the other hand, the trim is going down, then the program will move to the step S59 so as to provide temporary retardation.

It should be noted that the calibrations in this embodiment are similar to those of the embodiment of FIG. 10 with an engine having a configuration as shown in FIG. 11. Application to the other configurations of engines should be well within the scope of those skilled in the art from the foregoing description.

It should be readily apparent that the number of embodiments described are extremely effective in providing good running of an engine associated with an outboard motor regardless of the trim angle of the outboard motor and during all running conditions and also during starting. Although several embodiments of the invention have been illustrated and described, various changes and modifications may be made without departing from the spirit and scope of the invention, as defined by the appended claims.

We claim:

1. In an engine control for an outboard motor adapted to be mounted for trim adjustment of the position of the outboard motor, said engine having a manual control for operator adjustment of the speed of said engine, and at least one of a fuel system and an ignition system controlled by said manual control, the improvement comprising means for sensing the trim condition of the engine and means for adjusting the system of the engine for response to the sensed trim condition to maintain normal running even when the trim condition is changed.

2. In an engine control as set forth in claim 1 wherein the system comprises the spark advance system.

3. In an engine control as set forth in claim 2 wherein the engine is provided with a fuel supply system in which the air fuel ratio may vary in response to the trim angle.

4. In an engine control as set forth in claim 3 wherein the fuel supply system comprises a float operated device.

5. In an engine control as set forth in claim 4 wherein the float operated device comprises a carburetor.

6. In an engine control as set forth in claim 1 further including means for sensing the starting of the engine.

7. In an engine control as set forth in claim 6 further including means for adjusting the system when the means for detecting engine starting indicates the initiation of an engine starting sequence.

8. An engine control for an outboard motor adapted to be mounted for trim adjustment of the position of the outboard motor, said engine having means for starting the engine and at least one of a fuel system and an ignition system, the improvement comprising means for sensing the trim condition of the engine, and means for adjusting the system of the engine in response to the sensed trim condition and to starting.

9. In an engine control as set forth in claim 8 wherein the system comprises the spark advance system.

10. In an engine control as set forth in claim 9 wherein the engine is provided with a fuel supply system in which the air fuel ratio may vary in response to the trim angle.

11. In an engine control as set forth in claim 10 wherein the fuel supply system comprises a float operated device.

12. In an engine control as set forth in claim 11 wherein the float operated device comprises a carburetor.

* * * * *